Patented Aug. 9, 1949

2,478,270

UNITED STATES PATENT OFFICE 2,478,270

DEHYDRATION OF ALCOHOLS

Vladimir N. Ipatieff, Chicago, and George S. Monroe, Berwyn, Ill., assignors to Universal Oil Products Company, Chicago, Ill., a corporation of Delaware No Drawing. Application March 19, 1945, Serial No. 583,634

3 Claims. (Cl. 260—682)

This application is a continuation-in-part of our co-pending application Serial No. 464,136, filed October 31, 1942, and now abandoned.

This invention relates to the treatment of alcohols for the purpose of producing olefinic hydrocarbons. More specifically, it is concerned with a process for the production of mono-olefins from monohydric alcohols containing at least 3 carbon atoms per molecule.

It is recognized that, in general, the catalytic dehydration of alcohols to olefins has been known for some time. Catalysts used heretofore for dehydrating alcohols to olefins comprise oxides of metals such as alumina, thoria, etc., impregnations of various materials such as pumice with phosphoric acid, and siliceous material such as silica gel, kaolin, acid-treated clay, etc., and acids usually of a high degree of concentration. The solid catalysts which operate in heterogeneous systems are of the pre-formed or pilled type. Such catalysts must be regenerated periodically to remove carbonaceous deposits formed on them during the process and to restore their activity. Concentrated acids are likewise used with attendant disadvantages. In case the latter are employed, varying degrees of polymerization of the olefinic product accompanies the reaction, depending upon the concentration of the acid being used as catalyst. In contrast with the solid catalysts and the concentrated acid catalysts of the prior art we use, in the present process, an aqueous solution of an acid-acting substance such as an easily hydrolyzable metal salt or a mineral acid, having a pH between about 3 and about 7 which may be mixed intimately with the alcohol to be dehydrated. The advantage of intimacy of contact between the reactants and the catalyst, and in the case of some monohydric alcohols, the homogeneity of the reactant-catalyst phase, can be readily appreciated. The advantage of the possibililty of continuous successive reuse of the catalyst in the process of our invention can also be readily appreciated.

It is an object of the present invention to provide a process for producing olefins from alcohols containing at least 3 carbon atoms per molecule by the dehydration of the alcohol in the presence of an aqueous solution of an acid-acting substance having a pH between about 3 and about 7.

It is another object of the present invention to produce mono-olefins from monohydric alcohols containing at least 3 carbon atoms, without substantially polmerizing the mono-olefin so produced, by chemically dehydrating the said alcohol in the presence of an aqueous solution of an acid-acting substance having a pH between about 3 and about 7.

One embodiment of the present invention relates to a process for reacting a mono-hydric alcohol containing at least 3 carbon atoms per molecule in the presence of an aqueous solution of a hydrohalo acid having a pH value of from about 3 to about 7 and at such a temperature that the chemical dehydration of said alcohol to an olefin is the principal reaction of the process, and the polymerization of the olefin so produced is minimized.

A further embodiment of the present invention relates to a process for reacting a monohydric alcohol containing at least 3 carbon atoms per molecule in the presence of an aqueous solution of an acid-acting salt which hydrolyzes initially or during the course of the reaction to yield a catalytic solution, the pH of which will have a value of from about 3 to about 7 and at such a temperature that the chemical dehydration of said alcohol to an olefin is the principal reaction of the process.

The cation portion of the said acid-acting salts found to be most suitable for catalysts in the process of our invention and which give optimum yields of the desired products are particularly chosen from the right-hand columns of groups I, II, III, and IV and from the iron-group metals of group VIII of the periodic table. The anion radicals of the said acid-acting catalytic salts comprise the anions of the strong mineral acids, such as a hydrohalo acid, sulfuric acid, a phosphoric acid etc. Although all of the above specified acid-acting salts may be utilized in the dehydration of alcohols to produce olefins, the halide salts are preferably used. Besides the metallic acid-acting salts, the hydrohalo acids and the acid-acting ammonium salts diluted in water until such solutions have a pH value between about 3 and about 7, are likewise very effective; the last named non-metallic acid-acting substances are particularly advantageous in the operation of the process, since they do not deposit metal oxide precipitates on the inner surfaces of the equipment in which the dehydration reactions are carried out. The latter conditions may obtain in the case of some metal salts which hydrolyze in aqueous solutions and deposit their insoluble oxides or hydroxides on the interior of the apparatus, especially under the conditions employed in the process of my invention. The advantage of eliminating extensive maintenance and cleaning services on such equipment is obvious.

Alcohols utilizable as starting material for the present process comprise normal, secondary, and tertiary alcohols having at least 3 carbon atoms per molecule. In general, the tertiary alcohols yield dehydration products more readily than do the normal and secondary alcohols having the same number of carbon atoms per molecule, but the specific olefins formed in these cases are subjected to more pronounced polymerization, especially as the concentration of the acidic constituent in the dehydrating agent increases. Aliphatic alcohols such as isopropanol, tertiary butanol for example, alicyclic alcohols such as cyclohexanol, terpenic alcohols, such as tepineol, borneol, etc., and alkyl aromatic alcohols, as for example a phenylethyl alcohol (benzyl carbinol) or a phenylpropyl alcohol, which may be treated according to the process of this invention are not necessarily dehydrated under the same conditions of operation, since such alcohols differ markedly in their ease of dehydration, particularly in the presence of different acidic dehydration catalysts. The operating temperature for the process is generally between about 100° and about 400° C. and the concentration of catalyst in the aqueous solution employed is dependent upon the type of alcohol to be dehydrated, that is, whether it is primary, secondary, or tertiary and also upon the length and structure of its carbon chain or skeleton. Some primary and secondary alcohols yield ethers as well as olefins when subjected to the process of this invention. Usually the weight ratio of the alcohol to the dilute solution containing the catalyst will be approximately 1 to 1, but smaller or larger proportions of these materials may also be utilized.

The criticality of the concentration of the catalyst in the aqueous dehydrating solution has been established as affecting markedly the product of the process. Whereas a mono-olefin containing the same number of carbon atoms as present in the original alcohol is the desired product, polymers of these mono-olefins are obtained when the concentration of the catalyst in the dehydrating agent is too high or when the pH of the solution is decreased below a certain critical range. Substantially no dehydration of the alcohol is accomplished when the pH of the aqueous solution is increased above 7, that is, in alkaline solutions. Polymerization of propylene, for example, was markedly increased when isopropyl alcohol was dehydrated by an aqueous solution having a pH below about 3 (about 30% of the propylene polymerized) as compared to the dehydration conducted in a solution of pH from about 3 to about 7 (in which about 3% of the propylene polymerized). Further, the use of concentrated acids to polymerize olefins is a well known reaction.

The dehydration of alcohols to olefins in the presence of the catalysts herein described may be carried out in batch or continuous types of operation. In the batch type operation, the desired proportions of alcohol and aqueous solution containing either a mineral acid or an easily hydrolyzable acid-acting salt are charged to an autoclave, or other suitable reaction vessel, in which the reactants may be contacted under pressure for a time sufficient to effect dehydration into olefins of a substantial proportion of the alcohol charged to the process. The resultant mixture is separated into olefinic hydrocarbons, unconverted alcohol, and an aqueous solution containing the catalyst, the latter and the unconverted alcohol being utilized further in subsequent runs.

Alternatively, the production of olefinic hydrocarbons from alcohols may be made continuous by passing the alcohol and a dilute aqueous solution of the catalyst through a suitable reactor maintained at a temperature of from about 100° to about 400° C. and generally under a superatmospheric pressure below about 300 atmospheres. The olefinic hydrocarbon so produced is then separated from the unconverted alcohol and catalyst solution present in the reaction mixture. The unconverted alcohol and at least a portion of the catalyst solution may be recycled to the reaction zone in order to produce an additional quantity of the desired olefinic hydrocarbon.

In order to effect dehydration of an alcohol into an olefin according to the present process, it is necessary to have present with the alcohol in the reaction zone a relatively large amount of water containing the catalyst in solution. In some cases the catalyst may consist of a mere trace (about 0.001 wt. percent) of a hydrolyzable acid-acting salt in aqueous solution, and yet dehydration of from 70 to 85% of the original alcohol occurs, yielding an olefin having the same number of carbon atoms per molecule as the alcohol charged. In another case the catalytic solution may contain much higher percentages (up to about 4 or 5 wt. percent) of hydrolyzable salts (e. g. $MgCl_2$, $NH_4Cl$, $NaHSO_4$, $NaH_2PO_4$, etc.) which hydrolyze to give a solution of pH between about 3 to about 7, regardless of the dilution of the salt solution with water. In still other cases, the acid-acting salt (e. g. CuCl, $HgCl_2$, etc.) hydrolyzes in aqueous solution only to a limited degree, so that higher concentrations of these salts are necessary to yield a solution which will give initially to the solution or which will develop in the solution during the course of the reaction a pH of from about 3 to about 7. When hydrolyzable salts are employed in the absence of added water, only a relatively small amount of the alcohol is converted to the olefin. Even comparatively low conversions of alcohol into olefin in the presence of a salt but in the absence of added water are probably due to traces of water present in the supposedly anhydrous salt such as anhydrous $MgCl_2$ or anhydrous $FeCl_3$.

All of the hydrohalo acids effect dehydration of alcohols containing 3 or more carbon atoms per molecule to olefinic hydrocarbons if the acid is present in the aqueous solutions to the extent of giving to that solution a pH of from about 3 to about 7. In the total absence of water, the pure hydrogen halides are non-catalytic and practically no olefins are obtained; in aqueous solutions of the hydrohalides in which the acid concentration is sufficiently high to give to the solution a pH less than about 3, dehydration of the alcohol is nearly complete, but the olefin produced polymerizes to a considerable extent to give mixtures of polymer and mono-olefin, with substantial proportions of the polymer in the product; in aqueous solutions of the hydrogen halides having a pH of from about 3 to about 5, the resulting product comprises the monoolefin in 80–85% yields with only negligible formation of polymer. In catalytic solutions in which the pH lies between about 5 and about 7, both dehydration and polymerization decrease, but some dehydration product is always produced. When the pH of the solution becomes greater than 7, dehydration does not occur to any appreciable extent. It is quite unexpected that a dehydration reaction can thus be effected in the presence of a large amount of water containing a relatively small amount of a hydrohalo acid or a hydrolyzable metal halide salt as herein described.

The process of the present invention is thus effective for dehydrating alcohols to olefins in the presence of aqueous solutions containing mineral acids. The olefins so formed may also undergo substantially simultaneous isomerization, particularly that type of isomerization which involves the shifting of a double bond along a carbon chain during this treatment. For example, the dehydration of normal butyl alcohol in the presence of a dilute aqueous solution of ferric chloride yields about 3 molecular proportions of butylene-2 per one molecular proportion of butylene-1 while dehydration of this alcohol in the presence of alumina which is substantially non-acidic gives pure butylene-1. Naphthenic and terpenic alcohols such as borneol, isoborneol, and terpineol give cyclic olefins while aromatic alcohols yield arylalkenes which may also be regarded as aromatic substituted olefins.

In every instance in the present specification the term "dehydration" is used to designate chemical dehydration, that is, the chemical removal and combination of a hydroxyl group and a hydrogen atom, both of which are derived from the same molecule of an alcohol, to yield 1 molecule of the olefin plus 1 molecule of water. Thus our process, involving chemical dehydration of alcohols, differs from physical dehydration or drying, the latter implying merely the removal of water from a loosely combined water-alcohol solution.

The following examples are given to illustrate the character of results obtained by the use of the present process, although these examples are not introduced with the intention of unduly restricting the generally broad scope of the invention in accordance thereto.

Table I

*Dehydration of butyl alcohols to butylenes in the presence of hydrogen chloride or ferric chloride*

| Run Number | 4 | 5 | 6 | 7 | 8 | 9 |
|---|---|---|---|---|---|---|
| Runs made in | Steel autoclave | | | | Sealed glass | |
| Charge, grams: | | | | | | |
| N-Butyl Alcohol | 194 | | | | | |
| Sec.-Butyl alcohol | | 194.0 | 52.4 | 52.4 | 52.4 | 52.4 |
| Distilled water | 200 | 200.0 | 54.1 | | | |
| Catalyst— | | | | | | |
| FeCl₃·₆ H₂O | 3 | | 1.2 | 1.2 | | |
| FeCl₃-Anhydr | | | | | 0.7 | |
| Hydrogen chloride, 100% | | | | | | 0.25 |
| Temperature (Final), °C | 337 | 230 | 230 | 230 | 230 | 230 |
| Heating schedule of bomb: | | | | | | |
| Hours to heat to temp | 6 | 2.7 | 3.2 | 3.2 | 2.5 | 3.5 |
| Hours at temp. indicated | 0.5 | 2.7 | 0.5 | 0.5 | 0.5 | 0.5 |
| Pressure (atm.) | 312 | 42 | 83 | 48 | 43 | 42 |
| Wt. per cent alcohol dehydrated to butylenes | 65.5 | 0.0 | 82.7 | 11.2 | 11.9 | 0.0 |
| Wt. per cent alcohol converted to polymer | | | 2.6 | | | |
| Wt. per cent alcohol converted to ether | | | | 6.9 | 8.5 | |
| Isobutane | 1.0 | | | | | |
| N-Butane | 1.8 | | | | | |
| Butylene-1 | 20.8 | | | | | |
| Butylene-2 | 73.6 | | | | | |
| Isobutylene | 2.2 | | | | | |
| Pentanes and higher | 0.6 | | | | | |

EXAMPLE I.—(*Run No. 4 of the above Table I*)

Normal butyl alcohol, water, and ferric chloride hexahydrate were placed in a rotatable steel autoclave of 875 cc. capacity, rotated, and heated to 337° C. for 0.5 hr. after which the autoclave was cooled and the reaction products were removed and investigated.

The results of the experiment show that a solution containing 1.5 grams of ferric chloride hexahydrate per 100 grams of water and which developed during the course of the reaction a pH between about 3 to about 5, catalyzed the dehydration of 65.5% by weight of the n-butyl alcohol to butylenes.

EXAMPLE II

Secondary butyl alcohol was dehydrated more easily than normal butyl alcohol. Thus, with ferric chloride catalyst in substantially the same amount as shown in Example I, the dehydration of secondary butyl alcohol was easily accomplished at 230° C. to the extent of converting 82.7% of the alcohol into butylenes.

The experiments referred to in Table I were run in the autoclave itself and in sealed glass containers placed in the autoclave and counterbalanced by a proportionate amount of the same charge (the butyl alcohol) in the autoclave but outside the glass container to equalize pressure and prevent the glass container from breaking. Run 5 showed that no dehydration of butyl alcohol to butylene occurred in the presence of only water.

The experiments made in the sealed tubes show that hydrochloric acid in water, either introduced as such or produced by hydrolysis of the ferric chloride, is an active dehydration catalyst for alcohols. In the presence of ferric chloride (hexahydrate or anhydrous), but in the absence of added water, the dehydration was materially reduced (runs 7 and 8) and ether instead of polymer appeared as a by-product of the reaction.

The results of run 9 show that anhydrous hydrogen chloride did not catalyze the dehydration of secondary butyl alcohol at 230° C.

EXAMPLE III

As shown by the results given in Table II, tertiary butyl alcohol was dehydrated in the presence of a dilute metal chloride solution to produce an isobutylene yield of 84%.

Runs 10 and 11 made in a stainless steel autoclave with uncontaminated walls, gave the respective isobutylene yields of 2.3 and 3.5% in the presence and absence of water. In run 12 made in a rotatable stainless steel autoclave previously used for metal halide experiments of a different nature than those being described, though no catalyst was added, the unremovable traces of metal halides (probably chlorides of iron and nickel) in the pores of the walls were sufficient to effect 84% dehydration to isobutylene. This result indicates that even mere traces of metal halide in aqueous solution will cause dehydration of tertiary butyl alcohol.

Table II

*Dehydration of tertiary butyl alcohol to isobutylene at 200° C.*

| Run Number | 10 | 11 | 12 |
|---|---|---|---|
| Charge, grams: | | | |
| Tertiary butyl alcohol | 200.0 | 194.0 | 194.0 |
| Distilled water | | 200.0 | 200.0 |
| Catalyst | | | (¹) |
| Heating schedule of Autoclave, Time to heat to 200° C.: Hours | 2.3 | 2.5 | 1.7 |
| Time at 200° C. and pressure indicated: | | | |
| Hours | 2.5 | 2.5 | 2 |
| Atmospheres | 24 | 22 | 112 |
| Products obtained, grams: | | | |
| Condensed gas (isobutylene) | 3.9 | 3.3 | 124.4 |
| Unconverted alcohol and water | 182.8 | 375.4 | 262.3 |
| Loss, including uncondensed gas | 8.3 | 15.3 | 7.4 |
| Weight per cent of tertiary butyl alcohol decomposed to isobutylene | 5.5 | 2.3 | 84 |

¹ The stainless steel autoclave had been used previously for runs in the presence of a metal halide catalyst and traces of chlorides on the surface that could not be removed by washing with water were sufficient to catalyze the reaction. After Run 12, the analysis of the stabilized liquid product showed 0.006% by weight of chlorine and 0.002% by weight of nickel.

EXAMPLE IV 50 grams of borneol, 50 grams of water, and 5 grams of magnesium chloride hexahydrate were charged into a rotatable autoclave of 850 cc. capacity, nitrogen was added up to 20 atmospheres pressure, and the autoclave was then heated at a temperature, which was increased gradually from 250° to 300° C. during 3 hours at a maximum pressure of 130 atmospheres. The reaction product which was thus obtained after the autoclave had cooled to room temperature yielded 36 grams of camphene which solidified at −10° C.

EXAMPLE V

TABLE III

*Effect of pH (dil. aq. HCl solns.) on the dehydration of isopropyl alcohol to propylene and the formation of polymer*

| Apparatus | 850 cc. Rotating Autoclave with Capillary-Vented Glass Liners | | |
|---|---|---|---|
| Catalyst | Dilute Aqueous HCl Solutions | | |
| Molarity | 1.008 | 0.001 | 0.00001 |
| pH— | | | |
| Initial (Meter) | 0.1 | 3.2 | 5.1 |
| Final (Meter) | [1] <2 | 3.6 | 5.5 |
| Average (Meter) | <1 | 3.4 | 5.3 |
| Experimental Conditions: | | | |
| Initial Nitrogen Charged, Atm. | 36 | 35 | 35 |
| Time to Heat to Temp. and Press. Indicated— | | | |
| Time (Hrs.) | 2.00 | 2.00 | 2.00 |
| Temp. (°C.) | 275 | 275 | 275 |
| Press. (Atm.) | 142 | 108 | 98 |
| Time at Temp. and Press. Indicated— | | | |
| Time (Hrs.) | 3.00 | 3.00 | 3.00 |
| Temp. (°C) | 275 | 275 | 275 |
| Press. (Atm.) | 142–180 | 108–195 | 98–170 |
| Initial Press. at Room Temp., Atm. | 36 | 35 | 35 |
| Final Press. at Room Temp., Atm. | 50 | 50 | 40 |
| Charge, Grams: | | | |
| Isopropyl Alcohol | 91.0 | 90.0 | 90.0 |
| Dilute Aqueous HCl Soln. (See under Catalyst) | 92.2 | 90.0 | 90.0 |
| Total | 183.2 | 180.0 | 180.0 |
| Products, Grams: | | | |
| Propylene | 33.2 | 38.2 | 1.7 |
| Polymer | 15.5 | 2.3 | 0.0 |
| Isopropyl Alcohol (Recovered) | 14.2 | 23.7 | 87.7 |
| Dilute Aq HCl Soln. (Recovered) | 110.3 | 103.5 | 87.7 |
| Loss | 10.0 | 12.2 | 2.9 |
| Total | 183.2 | 179.9 | 180.0 |
| Conversions: | | | |
| Per Cent iso-$C_3H_7OH$ Dehydrated to $C_3H_6$ | 51.9 | 60.8 | 2.6 |
| Per Cent iso-$C_3H_7OH$ Converted to Polymer | 24.4 | 3.6 | 0.0 |

[1] pH estimated by special indicator paper.

The above Example V shows the effect of acid concentration (hydrochloric acid) on the dehydration of isopropyl alcohol and indicates that the chemical concentration for the said acid in determining whether dehydration proceeds with or without substantial polymerization of the olefins resulting from such dehydration does lie in a critical range of concentration. The results indicate that at a pH below about 3, the dehydration of the isopropyl alcohol was accompanied by substantial polymerization, and at pH above about 5 the concentration was too low to have any marked effect on dehydration, less than 3% of the alcohol reacting. It would appear, therefore, that a pH in a range of about 3 to about 5 was best for the dehydration of isopropyl alcohol without substantial polymerization, under the temperature and pressure conditions employed.

TABLE IV

*Effect of pH of aqueous salt solutions on the dehydration of isopropyl alcohol at 275° C. (equal weights of alcohol and water)*

| Salt | Max. Press. Atm. | Aq. Conc. Wt. Percent | pH of Soln.[1] | Percent Alcohol Dehydrated, Percent Converted to— | | |
|---|---|---|---|---|---|---|
| | | | | $C_3H_6$ | Polym. | Total |
| $CuCl_2$ | 150 | 3.5 | <3 | 36.6 | 31.8 | 68.4 |
| $HgCl_2$ | 160 | 4.0 | <3 | 52.8 | 21.8 | 74.6 |
| $ZnCl_2$ | 182 | 4.0 | 3–5 | 72.3 | 3.3 | 75.6 |
| $NH_4Cl$ | 160 | 6.0 | 3–5 | 79.5 | 1.1 | 80.6 |
| $MgCl_2$ | 174 | 2.0 | 3–5 | 60.3 | 2.5 | 62.8 |
| $CuCl^2$ | 185 | 4.0 | 3–5 | 68.0 | 3.2 | 71.2 |
| HF | 160 | 1.0 | 3–5 | 81.6 | 0.2 | 81.8 |

[1] pH determined by test with Congo Red and litmus; (pH determinations by means of a pH meter on solutions which were acid to Congo Red indicated that the Congo Red indicator changed color at a pH range of 3 and below.)

pH<3:
  acid to litmus
  acid to Congo Red
pH 3–5:
  acid to litmus
  neutral to Congo Red
[2] Not completely soluble in water.

The results given in the above Table IV show conclusively the effect of the acidity of the dehydrating solution on the polymerization of the product of the reaction. In the first two runs in which the aqueous solution either initially had or during the runs developed a Congo red acidity (pH less than 3) substantial polymerization of the propylene produced in the reaction occurred. In the last four runs in which the solution was acid to litmus, but neutral to Congo red (pH less than 7, greater than 3), no substantial polymerization occurred. The pH range of about 3 to about 7 for dehydrating alcohols is especially critical for alcohols that dehydrate at high temperatures, since under these conditions, polymerization is also more pronounced and would be a major reaction of the olefin produced in the dehydration step if concentrated catalysts were present.

The nature of the present invention and its commercial utility can be seen from the specification and examples given, although neither section is intended to limit its generally broad scope.

We claim as our invention:

1. A process for producing a mono-olefinic hydrocarbon without substantial polymerization of said olefinic hydrocarbon which comprises chemically dehydrating an alcohol selected from the group consisting of isopropyl alcohol and monohydric alcohols containing at least 4 carbon atoms per molecule, at a temperature of from about 100° C. to about 400° C. and in the presence of an aqueous solution of a hydrohalo acid having a pH in the range of from about 3 to about 7.

2. A process for producing propylene without substantial polymerization of said propylene which comprises chemically dehydrating isopropyl alcohol at a temperature of from about 100° C. to about 400° C. and in the presence of an aqueous solution of a hydrohalo acid having a pH between about 3 and about 7.

3. A process for producing isobutylene without substantial polymerization of said iso-butylene which comprises chemically dehydrating isobutyl alcohol at a temperature of from about 100° C. to about 400° C. and in the presence of an aqueous solution of a hydrohalo acid having a pH between about 3 and about 7.

VLADIMIR N. IPATIEFF.
GEORGE S. MONROE.

REFERENCES CITED

The following references are of record in the file of this patent:

UNITED STATES PATENTS

| Number | Name | Date |
|---|---|---|
| 2,218,640 | Friedrichsen et al. | Oct. 22, 1940 |
| 2,229,652 | Halbig et al. | Jan. 28, 1941 |
| 2,241,777 | Friedrichsen et al. | May 13, 1941 |

FOREIGN PATENTS

| Number | Country | Date |
|---|---|---|
| 66,866 | Germany | Jan. 17, 1893 |
| 583,564 | Germany | Sept. 6, 1933 |

OTHER REFERENCES

Ipatieff et al., J. A. C. S., 66, 1627–1631, Oct. 1944.